US007372054B2

(12) United States Patent
Gesell et al.

(10) Patent No.: US 7,372,054 B2
(45) Date of Patent: May 13, 2008

(54) RADIATOR MODULE

(75) Inventors: Gunther Gesell, Stephanskirchen (DE); Torsten Berge, Munich (DE); Rolf Wirth, Bruchmuhl (DE)

(73) Assignee: Advanced Photonics Technologies AG, Bruckmuhl (DE)

( * ) Notice: Subject to any disclaimer, the term of this patent is extended or adjusted under 35 U.S.C. 154(b) by 426 days.

(21) Appl. No.: 10/551,846

(22) PCT Filed: Apr. 1, 2004

(86) PCT No.: PCT/EP2004/003476

§ 371 (c)(1),
(2), (4) Date: Sep. 30, 2005

(87) PCT Pub. No.: WO2004/088713

PCT Pub. Date: Oct. 14, 2004

(65) Prior Publication Data

US 2006/0208192 A1 Sep. 21, 2006

(30) Foreign Application Priority Data

Apr. 3, 2003 (EP) ................................. 10315260

(51) Int. Cl.
*H05J 3/00* (2006.01)
*G01J 5/02* (2006.01)

(52) U.S. Cl. ............................. 250/504 R; 250/495.1; 392/427; 392/407; 392/425; 392/419; 392/420; 392/421; 338/296; 338/299; 338/304; 219/552; 219/270; 219/553; 362/217; 362/241

(58) Field of Classification Search ..................... None
See application file for complete search history.

(56) References Cited

U.S. PATENT DOCUMENTS 6,308,008 B1 * 10/2001 Johansson et al. .......... 392/427

* cited by examiner

*Primary Examiner*—Jack Berman
*Assistant Examiner*—Zia R. Hashmi
(74) *Attorney, Agent, or Firm*—Central Coast Patent Agency, Inc.

(57) ABSTRACT

Radiation module for thermal or UV irradiation processing procedures with a large number of radiation sources essentially adjacent and parallel to one another for electromagnetic radiation whose main effective range is in the UV spectrum, visible spectrum, and/or near infrared (NIR) part of the spectrum, particularly at wavelengths between 250 nm and 1.5 μm, whereby each of the radiation sources possesses an elongated central section, two bent ends, and two bent sections connecting the ends with the central section, and a reflector and cooler body bearing the radiation sources, whereby the reflector and cooler body possesses two end reflector sections assigned to the bent sections of the radiation source from the straight elongated main section to the ends formed as one piece.

9 Claims, 3 Drawing Sheets

RADIATOR MODULE

Figure 1:
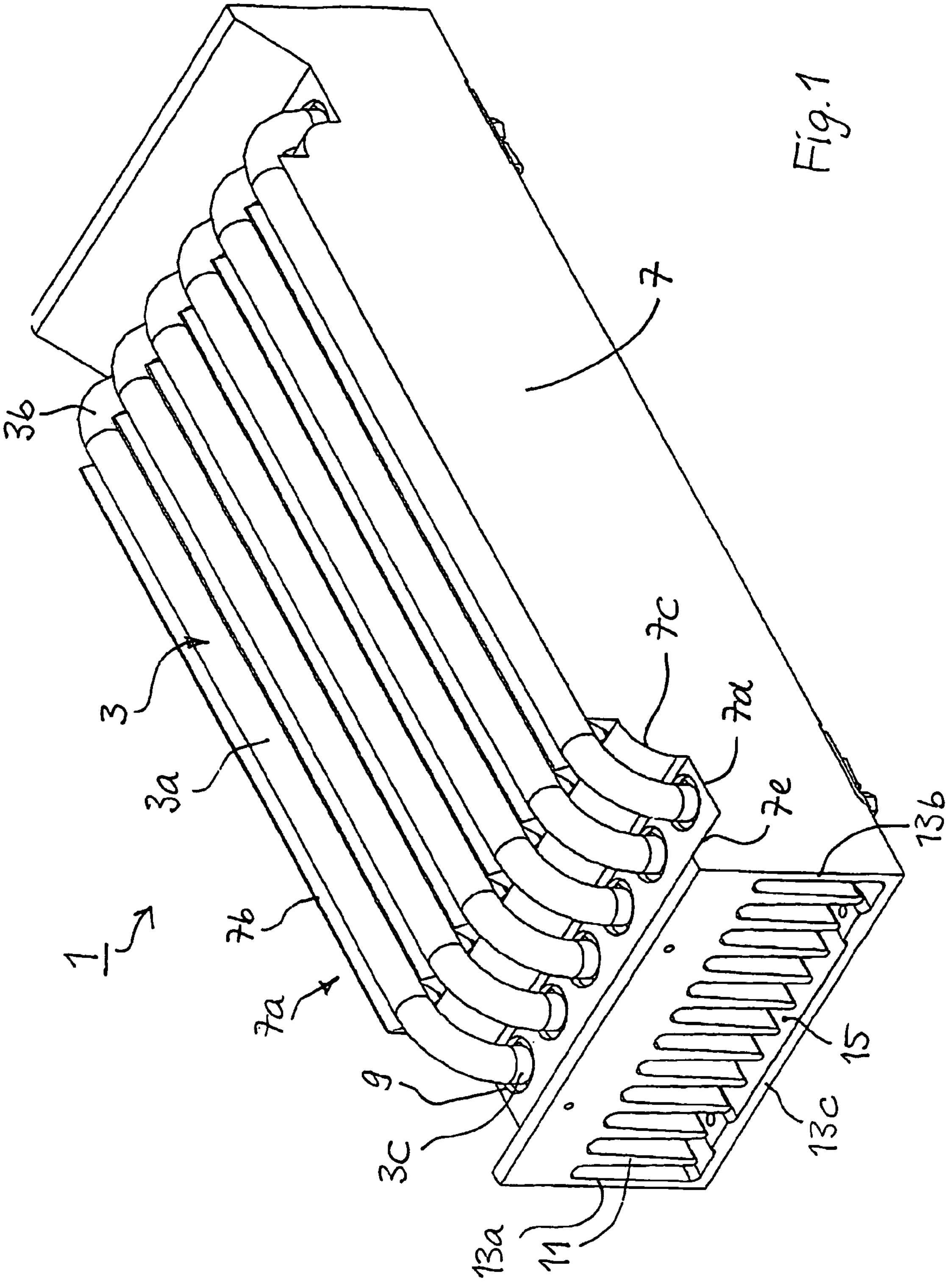

The invention relates to a radiation module based on the overall concept of Patent claim 1.

Procedures using electromagnetic irradiation for the treatment of painted coatings, superficial structure, or printing ink are known whose main effective range is in the near infrared (NIR) part of the spectrum, particularly at wavelengths between 0.8 μm and 1.5 μm. For these applications, the formation of a relatively large irradiation zone with a high degree of light density is significant in the interest of high productivity of the procedure in question.

From this, the use is known of several elongated halogen lamps arranged parallel to one another that possess a tubular glass body with sockets on its ends and with at least one spiral-wound filament in an elongated reflector as an irradiation system for thermal irradiation processes. The very high light densities achieved with such irradiation systems of more than 100 $kW/m^2$ (or much more) require cooling to achieve adequate lamp service life and retention of the shape of the reflector system.

In DE 100 51 641 A1 from this Applicant, a modularly assembled irradiation system with NIR radiators and integrated liquid cooling for the reflector was recommended for this reason.

From DE 100 51 642 A1, an irradiation system to implement processes of the abovementioned type is known that includes a cooled main reflector that bears the elongated halogen lamp and separate side reflectors to the sides of it. The latter are particularly essentially perpendicular to the plane extending through the central axes of the halogen lamps on the main reflector.

From DE 100 51 905 A1, also by this Applicant, a radiation source with elongated halogen lamps is known whose ends are bent into a glass body and thickened or sealed. In an advantageous embodiment, the lamp ends are provided with coolant for thermal conduction that is intended to provide for a steep T gradient between the bent areas of the glass body and the adjacent electrical connections. In an even more special embodiment, a compressed air flow channel with exhaust openings is provided near the ends of the lamp glass body.

In the unpublished German Patent Application No. 102 57 432.4, an air-cooled irradiation system is recommended that includes a reflector equipped with radiating fins on the rear side and a specially shaped channel system to conduct cooling air supplied by a ventilator to the rear side of the reflector.

The abovementioned radiation sources or irradiation devices have proved themselves in widespread applications, achieve high endurance, and produce irradiation zones with parameters demanded by users. However, application situations have arisen in which certain preconditions required for the use of irradiation systems, such as cool water or compressed air connections, are not available. Also, in certain applications, low cost limits exist whose observance is problematic with known designs.

It is therefore the task of the invention to provide an improved Radiation module that may be realized at relatively low cost but may be used without the use of additional components for many applications.

This task is solved by a radiation module with the properties of Patent claim 1. Useful expansions of the invention concept are the subjects of the Dependent Claims.

The invention includes the essential concept of positioning radiation sources (emitters) with ends bent backward integrated into the main reflector or side reflectors to improve the characteristics of the radiation field with special blending in the side areas using a simple and thus low-cost design. Further, the invention includes the idea of shaping these end reflector sections in a technologically advantageous manner as one piece onto the reflector or cooling body. This avoids additional installation work and preswitched separate manufacture, handling, and storage steps that represent a significant cost factor in the production of irradiation systems of the type described above.

In an advantageous embodiment, the end reflector sections are essentially flat along the entire width of the radiation module, and subtend an angle of between 30° and 75°, preferably between 45° and 60°, with the plane of the longitudinal dimension that lies parallel to the longitudinal axes of the radiation sources used. This embodiment ensures reflection of radiation laterally exiting from the bent radiation section into the working radiation field above the main reflector section, where the elongated central sections of the emitters are located, in a satisfactory manner for most applications. It particularly adequately prevents a decrease in radiation density in the side or end areas of the radiation field that lie above the bent sections of the radiator without the use of additional reflectors.

In this sense, another embodiment is also useful in which each of the end reflector sections is raised above an edge of the reflector and the cooling body which are at the same height as the transition from the bent section into the end of the radiation sources inserted into the reflector and cooling body, and include a separation from the bent sections of the radiation sources along the longitudinal dimension of the reflector and cooling body that is between one-half and one diameter of a radiation source. In a practical implementation of the radiation module, a suitable match between the inclination of the end reflectors with respect to the plane of the longitudinal dimension of the emitter and the distance from the 'foot line' of the end reflector sections from the bent areas of the radiator should be achieved, which with a few simple experiments the Specialist may achieve.

Further, it is adequate that the end reflector sections in the vertical dimension of the reflector and cooling body extend above the reflector and cooler body to a plane through the central axes of adjacent radiation sources at maximum. This allows limiting of the useful length and height of the reflector and cooler body without submitting to compromises regarding radiation density distribution in the radiation zone.

Also advantageous is an air-cooled embodiment of the radiation module in which cooling fins are formed on the rear side of the reflector and the cooler body facing away from the radiation source for the purpose of implementing forced-air cooling. This embodiment places little demand on the infrastructure available to the user. Alternatively, the invention may also be realized in an embodiment with liquid-cooled reflector body in which flow channels to conduct cooling liquid (cool water) are formed in a conventional manner.

The above-mentioned air-cooled embodiment may be expanded in a manner that allows both technical manufacture and technical cooling in that sidewalls are formed on the reflector and cooler body that especially extend above the height of the cooling fins and are connected by means of a rear wall. The cooling fins are thus located in an essentially closed cooling air canal extending along the longitudinal dimension of the radiation module. The output of a ventilator may be essentially tightly connected to it so that a highly effective degree of air cooling is achieved that is practically without influence on surrounding facility components, the piece of work in question, and the operating personnel.

In order to achieve particularly efficient cooling of the ends of the radiation sources and the electrical contact devices assigned to them, they are preferably equipped with cooling fins and are so emplaced in sections of the cooling fins that they receive the air stream flowing over the cooling fins. Thus, the use of additional cooling for the lamp ends (compressed air or similar) is superfluous, which further simplifies the use of the radiation module based on the invention.

Furthermore, in the abovementioned closed (preferably one-piece for technological reasons) embodiment of the reflector and cooler body, securing and connection media are mounted on the outer side of the rear wall to hold the radiation source in place and provide it with external electrical contact. Thus, the modular structure of an irradiation device consisting of the recommended radiation modules is simplified to allow exchange of individual emitters during operation of a corresponding facility.

Advantages and useful properties of the invention may be taken from the Dependent Claims, and from the following description of an advantageous embodiment example using Figures, which show:

FIG. 1 a perspective view of a radiation module according to an advantageous embodiment of the invention, seen from above, FIG. 2 a perspective view of a radiation module according to an advantageous embodiment of the invention, seen from below, and FIG. 3A to 3D a top view, a cross-sectional view, a longitudinal cutaway view, and a side view of the radiation module.

Figure 2:
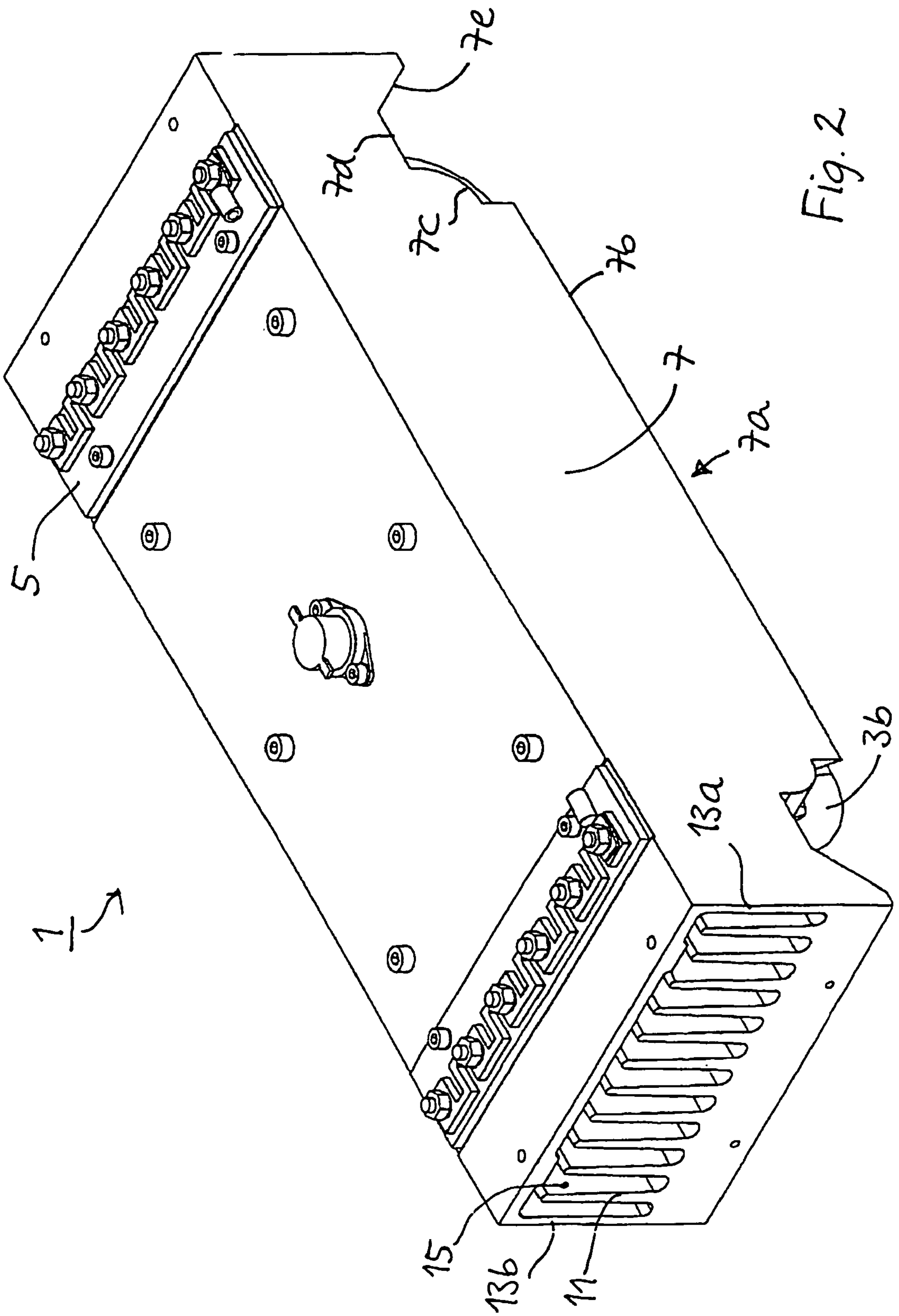

FIGS. 1 and 2 show a NIR-Radiation module 1 for thermal processing tasks in perspective view from above (of the reflector top side equipped with emitters 3) or from below (the rear side equipped with connector strips 5).

The core of the radiation module 1 is a one-piece reflector and cooler body 7. On the upper side 7*a* of the reflector six emitters 3 are mounted (as NIR radiators with halogen filament lamps with heightened operating temperature), each of which includes a glass body with a straight elongated central section 3*a* bent sections 3*b* connected to them from both sides, and which in turn possess end or holding sections 3*c*.

In order to match this shape of the emitter 3, the topside 7*a* of the reflector and cooler body 7 in the central area is provided with a large number of main reflectors 7*b* with essentially a W cross-section in parallel with one another to match the arrangement of the emitters. Along the emitter longitudinal dimension and adjacent to it, the reflector top side 7*a* of the reflector and cooler body possesses a bent section 7*c* with a quarter-circle longitudinal cross section. To this in turn is connected a flat section 7*d* parallel to the plane of longitudinal extension of the emitters 3 but recessed with respect to it. On both sides of the flat sections 7*d*, the reflector topside 7*a* possesses an end reflector section 7*e* at a 45° angle to the flat sections 7*d* and thus at a 45° angle to the plane of longitudinal extension of the emitters 3. The emitters 3 are each inserted through a circular access opening 9 in the flat section 7*d* of the reflector topside 7*a* of the reflector and cooler body.

The end reflector sections 7*e* possess a (not specially indicated) foot line from which they spring from the flat sections 7*d*, which in the illustrated embodiment example is displaced approximately half the lamp diameter with respect to the outermost points of the emitters 3 or access openings 9. The end reflector sections 7*e* are (as may most clearly be seen in FIG. 3*c*) drawn upward almost to the plane of the main reflector sections 7*b*.

Cooling fins 11 extending longitudinally are provided in the interior of the reflector body, and an enclosed cooling air channel 15 is formed within the reflector and cooler body 3 by these extended side walls 13*a* and 13*b* and the rear wall 13*c* connecting them.

Figures 3A, 3B, 3C, 3D:
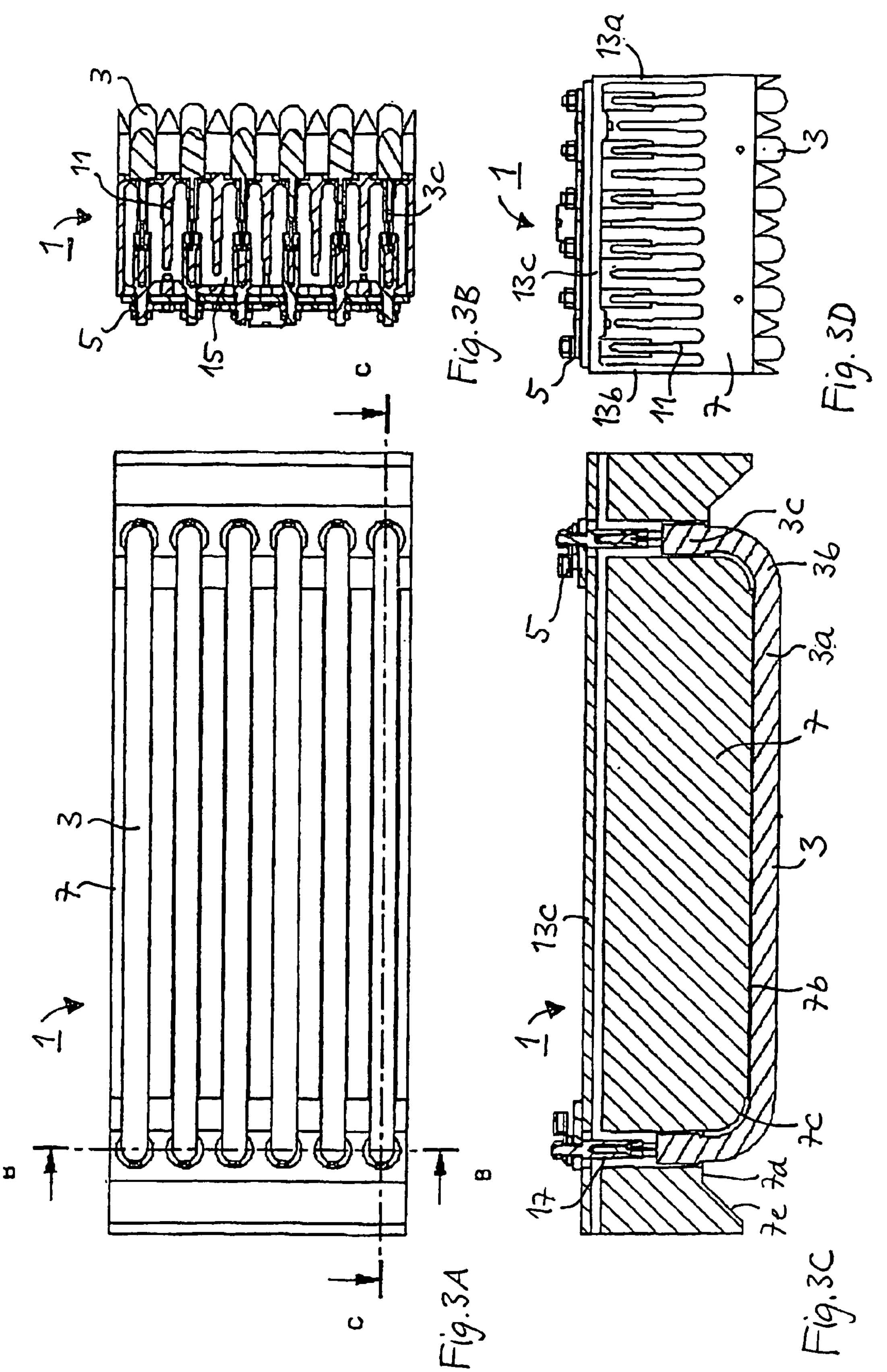

FIGS. 3A through 3D show details of this system, whereby it is particularly clear in FIGS. 3B and 3D that the end or holding sections 3*c* of the emitters 3 are so equipped with cooling fins, and namely every second cooling fin 11, that they are securely held in this area but are sufficiently exposed to a cool air stream flowing through the cool air channel 15 to achieve effective cooling of the lamp end. The lamp ends 3*c* are connected with the connector strips 5 electrically and mechanically via suitable plug connectors 17 (whose design is not the subject of this Application).

Implementation of the invention is not limited to this example, but rather is possible in a large number of applications within the scope of regular industry.

REFERENCE INDEX LIST

1 NIR-Radiation module
3 Emitter (Halogen filament lamp)
3*a* Central section
3*b* bent sections
3*c* End or holding section
5 Connector strip
7 reflector and cooler body
7*a* reflector topside
7*b* main reflector section
7*c* bent section
7*d* flat section
7*e* end reflector section
9 access opening
11 cooling fin
13*a*, 13*b* sidewall
13*c* rear wall
15 cooling air channel
17 plug connector

The invention claimed is:

1. Radiation module for thermal or UV irradiation processing procedures with a large number of radiation sources essentially adjacent and parallel to one another for electromagnetic radiation whose main effective range is in the UV spectrum, visible spectrum, and/or near infrared (NIR) part of the spectrum, particularly at wavelengths between 250 nm and 1.5 μm, whereby each of the radiation sources possesses an elongated central section, two bent ends, and two bent sections connecting the ends with the central section, and a reflector and cooler body bearing the radiation sources, characterized in that the reflector and cooler body possesses two end reflector sections assigned to the bent sections of the radiation source from the straight elongated main section to the ends formed as one piece.

2. Radiation module as in claim 1, characterized in that the end reflector sections are essentially flat over the entire width of the radiation module that lies parallel to the longitudinal axes of the radiation sources used and form an angle of between 30° and 75°, preferably between 45° and 60°, with the plane of the longitudinal axes of the radiation sources.

3. Radiation module as in claim 1, characterized in that each of the end reflector sections is raised above an edge of the reflector and cooling body that are at the same height as the transition from the bent section into the end of the radiation sources inserted into the reflector and cooling body, and include a separation from the bent sections of the radiation sources along the longitudinal dimension of the reflector and cooling body that is between one-half and one diameter of a radiation source.

4. Radiation module as in claim 1, characterized in that the end reflector sections extend along the height dimension of the reflector and cooler body maximum up to a plane extending through the central axes of the adjacent radiation sources above the reflector and cooler body.

5. Radiation module as in claim 1, characterized in that cooling fins are formed on the rear side of the reflector and cooler body facing away from the radiation source for the purpose of implementing forced-air cooling.

6. Radiation module as in claim 5, characterized in that the reflector and cooler body with side walls extending above the height of the cooling fins and a rear wall connecting them is so implemented that the cooling fins are contained within an essentially enclosed cool air channel extending along the longitudinal dimension of the reflector and cooler body.

7. Radiation module as in claim 5, characterized in that the ends of the radiation sources and electrical contact devices assigned to them are equipped with cooling fins and are so placed in sections of the cooling fins that that they receive the air stream flowing over the cooling fins.

8. Radiation module as in claim 6, characterized in that securing and connection media are mounted on the outer side of the rear wall to hold the radiation source in place and provide it with external electrical contact.

9. Radiation module as in claim 1, characterized in that the reflector and cooler body is formed as one piece.

* * * * *